H. A. HOUSE.
FLEXIBLE SHEET METAL BELTING.
APPLICATION FILED JAN. 21, 1916.
1,205,210.
Patented Nov. 21, 1916.
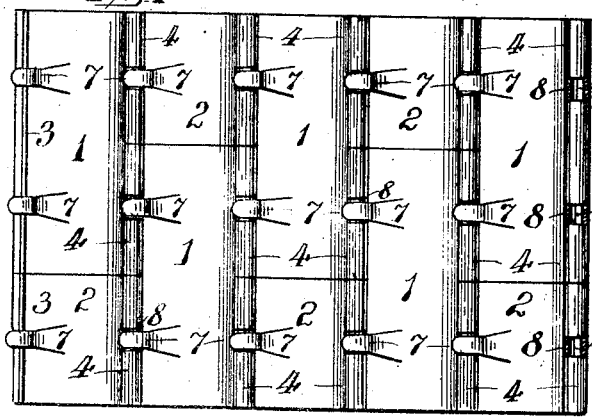
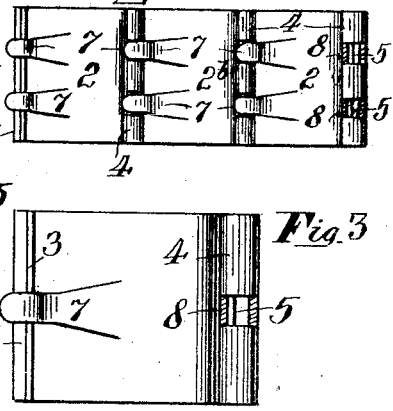
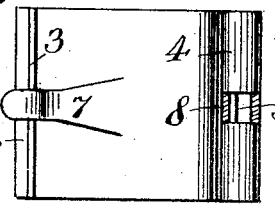
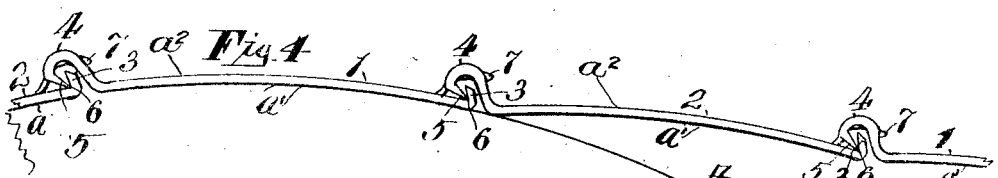
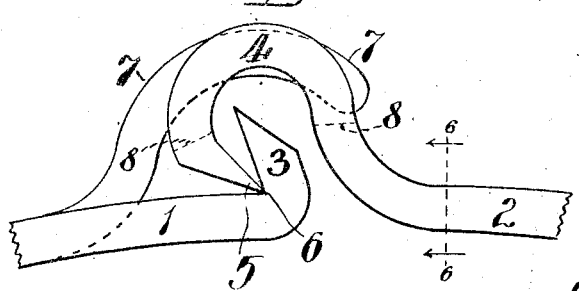
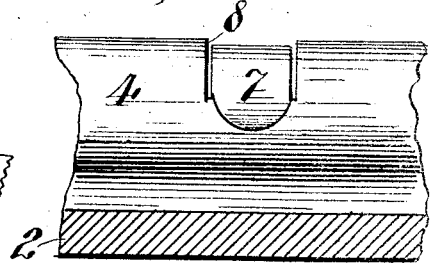
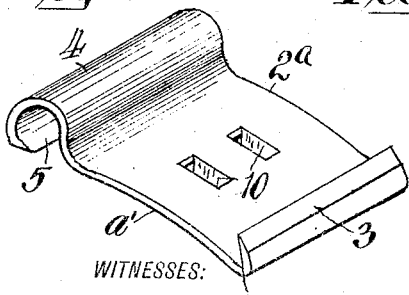
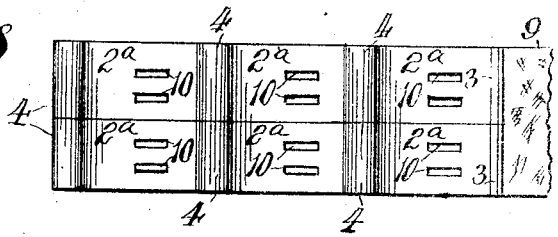
INVENTOR
Henry A. House
By Geo. D. Phillips
his ATTORNEY
WITNESSES:
Frank B. Jaynes
Raymond J. Brown

UNITED STATES PATENT OFFICE.

HENRY A. HOUSE, OF BRIDGEPORT, CONNECTICUT.

FLEXIBLE SHEET-METAL BELTING.

1,205,210.  Specification of Letters Patent.  Patented Nov. 21, 1916.

Application filed January 21, 1916. Serial No. 73,270.

*To all whom it may concern:*

Be it known that I, HENRY A. HOUSE, citizen of the United States, residing at Bridgeport, in the county of Fairfield and State of Connecticut, have invented certain new and useful Improvements in Flexible Sheet-Metal Belting; and I do hereby declare the following to be a full, clear, and exact description of the invention, such as will enable others skilled in the art to which it appertains to make and use the same.

My invention relates to flexible metal belting made up of a series of sheet metal units detachably linked together and working on knife edge bearings.

The object of my invention is to produce a light, cheap and efficient metallic drive belt and a practical substitute for leather belting.

Referring to the drawings: Figure 1 represents the exterior surface of a section of belting composed of a series of wide and narrow metal units linked together; Fig. 2 represents the exterior surface of a series of modified narrow units linked together to form a narrow belt; Fig. 3 is an enlarged detail view of one of the narrow units; Fig. 4 is a side elevation of a section of belting made up of units linked together, and a broken section of a pulley with which the belt engages; Fig. 5 is an enlarged broken sectional view of the knife edge connecting joint of two of the units; Fig. 6 is an enlarged broken sectional view on line 6—6 of Fig. 5; Fig. 7 is a detail perspective view showing another form of unit; and Fig. 8 is a reduced view of a series of units attached to a piece of fabric to form a composite belt.

Each unit is complete in itself. One form is made of thin sheet metal having a slightly curved inner or pulley bearing surface to impart the proper degree of elasticity when the units are assembled into a belt.

In the views, from Figs. 1 to 6, inclusive, the units 1 and 2 each comprise a link member provided with a smooth pulley bearing surface or inner side $a'$. In the embodiment, and at one end thereof, a retaining lip 3, and at the other end thereof, a bearing member 4, having a knife edge 5, are shown. The retaining lip and bearing member extend from the same side or surface of the unit, and in the embodiment shown extend from the outer side or surface $a^2$. In the embodiment, the retaining lip 3 is formed by bending back the end of the wall of the unit until the bent-back portion forms an acute angle with the wall, and the bearing member 4 is formed by bending back the other end of the unit at the same time, providing this end with a portion having its free edge beyond the wall, but pointing in a direction toward the wall. Both the retaining lip and bearing member extend or project from the same side of the unit, and in the embodiment shown, extend or project from the same outer side or surface. In the embodiment shown, the oblique angular bearing lip 3 is on one edge, and the reversely curved knife-edged bearing hook 4 is on the opposite edge of each unit. The knife edge 5 is adapted to rest in the angular seat 6 of the upturned retaining lip of an adjacent link as clearly shown in Figs. 4 and 5.

The units comprising the belt being made of thin metal will bring these knife edge joints practically on the pitch line of the pulley A and thus insure perfect rocking freedom to the knife edge joints, as it is impossible for any wear to take place between the knife edges 5 and their angular seats 6, as these knife edges can neither slip nor crawl, but must of necessity always remain in perfect rocking engagement under all circumstances.

Another form of my invention has each unit provided with one or more spring latches 7 formed from the body thereof and integral therewith and overlapping the angular lip 3, and when the units are assembled in a belt, these spring latches are adapted to snap into the latch openings 8 formed in the curved portions 4 of adjacent units to prevent lateral displacement of the units. When the units are assembled into a belt, the spring latches and latch openings are always in line with each other. The units can only be assembled by a transverse sliding movement, lifting the spring latches until they pass the latch openings.

The units can be made of any width required. The units 1 are shown two inches wide and the units 2 are one inch wide. In Fig. 2 is shown a section of belting composed entirely of a modified form of smaller or one inch units $2^b$. The wider or two inch units 1 could also be assembled to form a belt two inches wide. But in making a belt wider than that composed of the single units above mentioned, it is imperative that both wide and narrow units be assembled together to break joints in such a manner as to leave the outer edges of the unit assembled belt smooth and even. By this arrangement of wide and narrow units and their proper distribution and relation to each other, a belt of any width can be made.

The proper relative position of the wide and narrow units to each other is fully illustrated in Fig. 1, where the one inch and two inch wide units are shown assembled into a three inch wide belt, in such a manner as to leave the edges of the belt smooth and even. It will be observed that the two inch units have two spring latches and two latch openings and these units overlap each other so that one of the spring latches of a two inch unit will engage a latch hole or opening in another two inch unit, while the other spring latch will engage the latch opening in a one inch unit, thus breaking joints and tying the units together in workable relation to each other. It will be observed that the units are so placed and assembled that the spring latches and latch openings of both wide and narrow units are all in alinement. Belts of any width can thus be assembled by extending the wide units and filling in the space at each end with a narrow unit. In fact, it would be impossible to form a multiple unit belt wider than any single unit and couple them together against lateral displacement, and have the edges of the unit assembled belt smooth and even, without employing wide and narrow units assembled in broken jointed arrangement as previously set forth.

In another form of my invention, shown in unit 2ᵃ in Fig. 7, the spring latches and latch openings are dispensed with, and a series of these units may be attached to canvas or any like flexible fabric or split leather to form a composite belt, as shown in Fig. 8. The units in this arrangement can all be of the same size, and when attached to the flexible conveyer or carrier 9 there is no tendency toward lateral displacement. Any number of these units and all of the same size may be employed to make a belt of any desired width. The driving pull of this composite belt will all come on the metal units the same as in the before mentioned construction and not on the conveyer 9. In the composite belt construction there is no necessity of breaking joints with the units. Any well known means may be used for securing the units to the conveyer 9. As shown, the stock may be broken down in the body of the unit to form the clips 10 so as to pierce the conveyer and be clenched thereto.

The several units can be automatically made from strip stock the width of the unit without a particle of waste. In using a belt composed of units having spring latches to prevent lateral displacement of the units, the pulley is preferably first covered with leather canvas or other like material, but with the composite belt construction shown in Fig. 8, this is not necessary.

It will be seen that in the embodiment shown in Fig. 4 the link members, when engaging, have one of their sides, in the embodiment, the inner or bearing side, free from pivotal connections and disposed along a line, that is, have one of their sides or surfaces in substantial alinement with the corresponding sides or surfaces of adjacent link members.

I have shown various embodiments of my invention, but it is clear that changes may be made therein without departing from the spirit of the invention as defined in the appended claims.

Having thus described my invention, what I claim is:—

1. A belt unit comprising a link member having at one end a retaining member and at the other end a bearing member, the retaining and bearing members projecting in a direction away from the same side of the link member, and said retaining member being shaped to be engaged by a bearing member like that at the other end of the link member, and said bearing member being shaped to engage a retaining member like that on the other end of said link member.

2. A belt unit having on one end a retaining member projecting from the side of the unit, and at the other end a bearing member projecting from the same side of the unit and having a knife edge, the knife edge of the bearing member being adapted to engage the retaining member of a like adjacent unit.

3. A belt unit curved to form a pulley surface and having at one end a retaining member projecting above the side of the unit, and at the other end a bearing member projecting above the same side of the unit and having a knife edge, the knife edge of the bearing member being adapted to engage the retaining member of a like adjacent unit.

4. A belt unit formed of a single piece of thin metal having a curved pulley surface, and a lip bent back at one edge to an acute angle to said curved surface, and a bearing hook bent back at the opposite end of said unit to an obtuse angle to the same side of said curved surface, and having a knife edge extending in a direction toward the surface, and in an opposite direction to the direction of the lip, but substantially parallel with the lip.

5. A sheet metal belt unit adapted to form a pulley surface, having on one end a retaining member, a latch on the unit at the retaining member end, and a bearing member on the other end of said unit and having an opening therein, the bearing member being adapted to engage the retaining member of a like adjacent unit, and the latch being adapted to engage with the opening of said like adjacent unit.

6. A sheet metal belt unit curved to form a pulley surface having on one edge an inwardly inclined retaining lip projecting above the outer surface of the unit, a spring latch integral with the unit and overlapping the retaining lip, and a reversely curved knife edge bearing hook formed on the opposite edge of said unit and integral therewith and having a latch opening formed therein.

7. A flexible belt composed of a series of wide and narrow sheet metal units workably connected together on knife edge bearings, the units being provided with spring latches and latch openings, the wide units overlapping one another and the spaces being filled with the narrow units so as to leave the edges of the belt smooth and even, the spring latches and latch openings being in alinement with one another with the former engaging the latter to prevent lateral displacement of the units.

8. A flexible belt composed of a series of wide and narrow sheet metal units, each unit curved to form a pulley bearing surface and having on one edge an inwardly inclined retaining lip projecting above its outer surface, a spring latch integral with the unit and overlapping the lip, and a reversely curved knife edge bearing hook on the opposite edge adapted to engage with the retaining lip of an adjacent unit, said hook having an opening to receive the latch of an adjacent unit, the wide units overlapping one another and the spaces being filled with the narrow units so as to leave both edges of the belt smooth and even, the spring latches and latch openings being in alinement with one another and engaging one aother to prevent lateral displacement of the assembled units.

9. In combination, a plurality of matching units, each consisting of a link member having at one end a retaining member and at the other end a bearing member, each retaining member and bearing member being disposed at the same side of the link member, and each retaining member of one unit being engageable by the bearing member of an adjacent unit, and all the link members, when so engaged, having their bearing sides in substantial alinement with the corresponding sides of adjacent link members.

10. In combination, a plurality of matching units, each consisting of a resiliently curved link member having at one end a retaining member and at the other end a bearing member, each retaining member and bearing member being disposed at the same side of the link member, and each retaining member of one unit being engageable by the bearing member of an adjacent unit, and all the link members, when so engaged, having their bearing sides in substantial alinement with the corresponding sides of adjacent link members.

11. In combination, a plurality of matching units, each consisting of a link member having at one end a retaining member and at the other end a bearing member, and each having a spring latch at one end and an opening at the other, and each retaining member of one unit being engageable by the bearing member of an adjacent unit, and each opening of one unit being engageable by the spring latch of an adjacent unit, and all the link members, when so engaged, having their bearing sides in substantial alinement with the corresponding sides of adjacent link members.

12. A sheet metal belt comprising a plurality of link members having their bearing sides in substantial alinement with the corresponding sides of adjacent link members, each link member having a knife edge at one end thereof, and a bearing member for a knife edge at the other end thereof, each link member having its bearing member engaged by the knife edge of the adjacent link member.

In testimony whereof I affix my signature in presence of two witnesses.

HENRY A. HOUSE.

Witnesses:
   GEORGE N. SEARS,
   MARGARET SMITH.